United States Patent
Mukherjee et al.

(10) Patent No.: US 12,366,226 B2
(45) Date of Patent: Jul. 22, 2025

(54) LEADING EDGE PROTECTION FOR A WIND TURBINE BLADE

(71) Applicants: BLADE DYNAMICS LIMITED, Hampshire (GB); LM WIND POWER A/S, Kolding (DK)

(72) Inventors: Manish Mukherjee, Hampshire (GB); Michael Haag, Kolding (DK)

(73) Assignees: BLADE DYNAMICS LIMITED, Eastleigh Hampshire (GB); LM WIND POWER A/S, Kolding (DK)

( * ) Notice: Subject to any disclaimer, the term of this patent is extended or adjusted under 35 U.S.C. 154(b) by 0 days.

(21) Appl. No.: 18/019,686

(22) PCT Filed: Aug. 5, 2021

(86) PCT No.: PCT/EP2021/071845
§ 371 (c)(1),
(2) Date: Feb. 3, 2023

(87) PCT Pub. No.: WO2022/029214
PCT Pub. Date: Feb. 10, 2022

(65) Prior Publication Data
US 2023/0265828 A1    Aug. 24, 2023

(30) Foreign Application Priority Data
Aug. 5, 2020    (GB) ..................... 2012135

(51) Int. Cl.
*F03D 1/06*    (2006.01)
*F03D 80/50*    (2016.01)

(52) U.S. Cl.
CPC ......... *F03D 1/0675* (2013.01); *F03D 1/0688* (2023.08); *F03D 80/50* (2016.05);
(Continued)

(58) Field of Classification Search
CPC .... F03D 1/0675; F03D 1/0683; F03D 1/0643; F03D 1/0688; F03D 80/30; F03D 80/40; F05B 2240/303
See application file for complete search history.

(56) References Cited

U.S. PATENT DOCUMENTS 5,782,607 A     7/1998  Smith et al.
7,237,751 B2 *  7/2007  Anning ................. B64C 27/473
                                                        244/123.3
(Continued)

FOREIGN PATENT DOCUMENTS

EP      3098438 A1      11/2016
JP      2014-148984 A   8/2014
(Continued)

OTHER PUBLICATIONS

NPL Gelcoat Wikipedia; captured of Aug. 3, 2020 (Year: 2020).*
(Continued)

*Primary Examiner* — Woody A Lee, Jr.
*Assistant Examiner* — Wesley Le Fisher
(74) *Attorney, Agent, or Firm* — Nath, Goldberg & Meyer; Tanya E. Harkins

(57) ABSTRACT

Disclosed is a wind turbine blade extending from a root end to a tip end, the wind turbine blade comprising a root region, and an airfoil region comprising the tip, a pressure side, a suction side and a chord extending between a leading edge and a trailing edge. The wind turbine blade comprises a leading edge protection element at the leading edge of the wind turbine blade. The leading edge protection element extends in a longitudinal direction between an outboard end and an inboard end and comprises a first section extending from the outboard end to a first section position, wherein the first section is made of a first erosion protection material having a first erosion resistance, and a second section extending from the first section position to a second section (Continued)

position, wherein the second section is made of a second erosion protective material having a second erosion resistance. The first erosion resistance is larger than the second erosion resistance.

14 Claims, 5 Drawing Sheets

(52) U.S. Cl.
CPC . *F05B 2240/303* (2020.08); *F05B 2280/6003* (2013.01); *F05B 2280/6011* (2013.01)

(56) References Cited

U.S. PATENT DOCUMENTS

| | | | |
|---|---|---|---|
| 9,920,444 B2* | 3/2018 | Gatley | B32B 15/01 |
| 10,538,317 B2* | 1/2020 | Nissen | B64C 27/473 |
| 10,844,843 B2* | 11/2020 | Fujioka | F03D 9/25 |
| 10,954,916 B2* | 3/2021 | Drachmann Haag | F03D 1/0675 |
| 11,067,058 B2* | 7/2021 | Stege | B32B 3/30 |
| 11,441,545 B2* | 9/2022 | Mathew | F03D 80/30 |
| 11,519,390 B2* | 12/2022 | Murata | F03D 80/30 |
| 11,530,681 B2* | 12/2022 | Lübker | F03D 13/20 |
| 11,542,920 B2* | 1/2023 | Cao van Truong | F03D 80/40 |
| 2005/0169763 A1 | 8/2005 | Anning | |
| 2013/0045105 A1* | 2/2013 | Driver | F03D 1/0675 29/889.7 |
| 2014/0186188 A1* | 7/2014 | Takeuchi | F03D 1/0675 416/224 |
| 2015/0337447 A1 | 11/2015 | Gatley | |
| 2018/0029699 A1* | 2/2018 | Nissen | B64C 27/473 |
| 2018/0230966 A1* | 8/2018 | Drachmann Haag | B29C 65/5057 |
| 2019/0293050 A1* | 9/2019 | Ruijter | F03D 80/50 |
| 2020/0040869 A1* | 2/2020 | Stege | B32B 37/182 |
| 2020/0240391 A1* | 7/2020 | Lübker | B32B 27/40 |
| 2021/0262350 A1* | 8/2021 | Mathew | F03D 80/30 |

FOREIGN PATENT DOCUMENTS

| | | |
|---|---|---|
| JP | 2016-223325 A | 12/2016 |
| WO | 2014/102957 A1 | 7/2014 |

OTHER PUBLICATIONS

NPL Elastomer Wikipedia; captured on Dec. 17, 2019 (Year: 2019).*
Communication Pursuant to Article 94(3) EPC dated Dec. 4, 2023 corresponding to European application No. 21755939.2-1002.
Office Action dated Jun. 28, 2024 issued in corresponding Japanese Application No. 2023-507402.

* cited by examiner

LEADING EDGE PROTECTION FOR A WIND TURBINE BLADE

This is a National Phase Application filed under 35 U.S.C. 371 as a national stage of PCT/EP2021/071845, filed Aug. 5, 2021, an application claiming the benefit of Great Britain Application 2012135.6, filed Aug. 5, 2020, the content of each of which is hereby incorporated by reference in its entirety.

The present disclosure relates to wind turbine blades and manufacture of wind turbine blades. More specifically, the present disclosure pertains to the field of protection of wind turbine blades against environmental influence, such as protection of the leading edge of wind turbine blades.

BACKGROUND

Wind turbines need to be designed for operation for several years, e.g. at least 20 years. To maximise the annual energy production (AEP), it is important that the down-time of the wind turbine is minimised and intended AEP during use is maximised. During operation the airfoil in the outboard region of the blade, where critical erosion inset velocities are exceeded, is subject to increased wear caused by impact of particles in the air. To reduce the wear and erosion on the leading edge there is a need for a robust material on the wind turbine blade, and especially the leading edge where particles in the air impact the blade at high speed due to the blade trajectories in operation.

Wind turbine blades may be repaired to increase the life span and/or to reduce the erosion damage in the leading edge area. However, this goes against the requirements of minimising down-time. Further, it is difficult and costly to repair wind turbines, in particular offshore wind turbines. As an alternative or supplement, a protective element may be attached to the leading edge, e.g. the erosion sensitive area of the wind turbine blade. However, the shape and the location of the protective element has a large impact on the drag, lift and noise of the blade, which in turn also may influence the AEP.

The tip of the wind turbine blade travels with the highest velocity and the leading edge near the tip is therefore subject to most wear. Therefore, it may be sufficient to apply the leading edge protection element to only a part of the leading edge towards the tip of the wind turbine blade. Since the tip is subject to more wear, the tip may be protected with a more erosion resistant material than the more inboard area.

Furthermore, to increase the annual energy production (AEP) the operation speed of the wind turbine blades may be increased to 100 m/s or higher. For comparison, conventional wind turbine blades typically operate at a speed of under 90 m/s at the tip. However, the higher the speed of the wind turbine blade, the more wear the blade is exposed to. Thus, higher requirements to the erosion resistance is also required when the blade speed is increased.

In erosion testing, the erosion progress is commonly described as the stages of incubation, mass loss and breakthrough to the underlying substrate. The incubation period represents the exposure time until the first mass loss or damages are visually detectable. The incubation period depends on the impact speed of the incoming particles. The time of breakthrough is the point in time when the erosion progress breaks through the protective layer to the underlying substrate.

SUMMARY OF THE INVENTION

It is an object of the present disclosure to provide a leading edge protection element and a leading edge portion of a wind turbine blade which overcomes or ameliorates at least some of the disadvantages of the prior art.

In particular, it is an object of the present invention to provide a method for protecting a leading edge of a wind turbine blade, which improves the robustness, e.g. against erosion, of wind turbine blades while reducing the impact on the aerodynamic efficiency and optimizing the material usage. The optimization of materials used for protecting the leading edge may be needed to reduce cost and/or reduce manufacturing time. Improvement in the robustness of the wind turbine blade may further prolong the life span of the individual wind turbine blades. In addition to prolonged life span of wind turbine blades the present invention provides a higher annual energy production by optimizing the placement of a leading edge protection element such that tip speed may be increased. The high annual energy production may be maintained by eliminating erosion of the leading edge.

Thus, the present invention relates to a wind turbine blade extending from a root end to a tip end. The wind turbine blade comprises a root region, and an airfoil region comprising the tip, a pressure side, a suction side and a chord extending between a leading edge and a trailing edge. The wind turbine blade comprises a leading edge protection element, such as a sectionised leading edge protection element, at the leading edge of the wind turbine blade. The leading edge protection element extends in a longitudinal direction, e.g. a direction parallel to the longitudinal direction of the wind turbine blade, between an outboard end and an inboard end. The leading edge protection element comprises a first section extending from the outboard end to a first section position. The first section is made of a first erosion protection material having a first erosion resistance. The leading edge protection element comprises a second section extending from the first section position to a second section position. The second section is made of a second erosion protective material having a second erosion resistance. The first erosion resistance is larger than the second erosion resistance.

In a preferred embodiment, the disclosure relates to a wind turbine blade extending from a root end to a tip end. The wind turbine blade comprises a root region, and an airfoil region comprising the tip, a pressure side, a suction side and a chord extending between a leading edge and a trailing edge. The wind turbine blade comprising a blade shell, such as a first blade shell part and a second blade shell part, made of a composite material comprising fibre-reinforcement material embedded in a polymer material. The wind turbine blade comprises a leading edge protection element, such as a sectionised leading edge protection element, at the leading edge of the wind turbine blade. The leading edge protection element extends in a longitudinal direction, e.g. a direction parallel to the longitudinal direction of the wind turbine blade, between an outboard end and an inboard end. The leading edge protection element comprises a first section extending from the outboard end to a first section position. The first section is made of a first erosion protection material having a first erosion resistance. The leading edge protection element comprises a second section extending from the first section position to a second section position. The second section is made of a second erosion protective material having a second erosion resistance. The first erosion resistance is larger than the second erosion resistance. The leading edge protection element is distinct from the composite material of the blade shell.

In another preferred embodiment, the disclosure relates to a wind turbine blade extending from a root end to a tip end. The wind turbine blade comprises a root region, and an airfoil region comprising the tip, a pressure side, a suction side and a chord extending between a leading edge and a trailing edge. The wind turbine blade comprises a leading edge protection element, such as a sectionised leading edge protection element, at the leading edge of the wind turbine blade. The leading edge protection element extends in a longitudinal direction, e.g. a direction parallel to the longitudinal direction of the wind turbine blade, between an outboard end and an inboard end. The leading edge protection element comprises a first section extending from the outboard end to a first section position. The first section is made of a first erosion protection material having a first erosion resistance. The leading edge protection element comprises a second section extending from the first section position to a second section position. The second section is made of a second erosion protective material having a second erosion resistance. The first erosion resistance is larger than the second erosion resistance. The leading edge protection element comprises a third section extending from the second section position to the inboard end. The third section is made of a third erosion protection material having a third erosion resistance. The first erosion resistance and/or the second erosion resistance is larger than the third erosion resistance.

It is an advantage of the present disclosure that a better protection of a wind turbine blade is provided due to the robust leading edge protection element. It is a further advantage of the present disclosure that a material with a high erosion resistance is used where the erosion is most prominent. In the areas with less erosion a material with a lower erosion resistance may be used. Thus, a way of optimizing the material used to protect the wind turbine blade is provided. This way of optimizing the material may also provide a better cost benefit. Furthermore, with an improved protection of the wind turbine blade the operation speed of the wind turbine blades may be increased to increase the annual energy production (AEP).

It is a further advantage of the present disclosure that the leading edge protection element may be provided in sections, thus transportation of the leading edge element is simplified and costs reduced. Further, the leading edge protection element may also readily be retrofitted to the blade or replace an existing leading edge protection element.

Also disclosed is a method for protecting a leading edge of a wind turbine blade. The method comprises providing a wind turbine blade. The wind turbine blade extends from a root end to a tip end, and comprising a root region, and an airfoil region comprising the tip, a pressure side, a suction side and a chord extending between the leading edge and a trailing edge.

The method comprises providing a leading edge protection element at the leading edge of the wind turbine blade. The leading edge protection element extends in a longitudinal direction between an outboard end and an inboard end. The leading edge protection element comprises a first section extending from the outboard end to a first section position. The first section is made of a first erosion protection material having a first erosion resistance.

The leading edge protection element comprises a second section extending from the first section position to a second section position. The second section is made of a second erosion protective material having a second erosion resistance. The first erosion resistance is larger than the second erosion resistance.

In a preferred embodiment, the wind turbine blade comprises a blade shell made of a composite material comprising fibre-reinforcement material embedded in a polymer material and the leading edge protection element is distinct from the composite material of the blade shell.

In another preferred embodiment, the leading edge protection element further comprises a third section extending from the second section position to the inboard end. The third section is made of a third erosion protection material having a third erosion resistance. The first erosion resistance and/or the second erosion resistance is larger than the third erosion resistance.

The method may comprise attaching the leading edge protection element to at least part of the leading edge of the wind turbine blade The leading edge protection element may be attached to an outer surface of the blade shell of the leading edge of the wind turbine blade. Leading edge protection element may be configured to be attached to the outer surface of the blade shell of the leading edge of a wind turbine blade.

The first erosion protection material may comprise a metal material, such as one or more of nickel-based alloy, titanium, stainless steel, aluminium, shape memory alloys, austenitic nickel-chromium-based alloys. Examples of shape memory alloys may be copper-aluminium-nickel and nickel-titanium. An example of an austenitic nickel-chromium-based alloy may be Inconel, such as Inconel 718.

The second erosion protection material may comprise a polymer material, such as one or more of Polyurethane thermoset rubbers, thermoplastic polyurethanes, UHMWPE, PEEK, polycarbonate, ABS or rubbers such as, nitrile rubber (NBR), ethylene propylene diene monomer (EPDM), styrene-butadiene rubber (SBR) or polybutadiene.

The leading edge protection element may comprise a third section extending from the second section position to the inboard end. The third section may be made of a third erosion protection material having a third erosion resistance. The first erosion resistance and/or the second erosion resistance may be larger than the third erosion resistance.

The third erosion protection material may comprise one or more of a paint system material, such as conventional 2-component aliphatic polyurethane or 2-component epoxy, and/or a gelcoat material, such as epoxy, polyester or polyurethane, and/or a thermoplastic material, such as PMMA or PET.

The third section may correspond to the outer gelcoat and/or paint layer of the wind turbine blade. In this case, the leading edge protection element comprises a first section and a second section which are attached to the leading edge of the wind turbine blade starting from the tip end. The third section may be attached to provide a smoother transition from the second section to the outer surface of the wind turbine blade. As such, the blade may also comprise only two leading edge protection elements sections and the third section may be protected by the main structure of the blade. The exterior surface of the blade is typically made with a gelcoat to have a smooth exterior.

The nature of the material of the first section will be able to protect against more erosion than the material of the second section. Thus, the tip area of the wind turbine blade, where most erosion occurs due to larger rotational velocities, may be protected with a first erosion protective material that may withstand more erosion. The area more inboards, where less erosion occurs, may be protected with a second erosion protection material that withstands less erosion compared with the first erosion protection material, but may be less expensive.

The first erosion resistance, second erosion resistance and third erosion resistance may be dependent on the velocity of the respective part of the wind turbine blade they are configured to protect. The erosion resistance may be expressed as the time it takes before visible damage is present in the material when exposed to wear, e.g. rain droplets, under standardized conditions. The test may for instance be a so-called rain erosion test performed on a sample of the leading edge protection element, e.g. by simulating rain erosion for a predetermined time period. The test may for instance be carried out in accordance to ASTM G73-10 or DNVGL-RP-0171.

The method may comprise arranging the leading edge protection element such that the first section is arranged proximal the tip of the wind turbine blade. The method may comprise arranging the leading edge protection element such that the second section is arranged proximal the root of the wind turbine blade. The method may comprise arranging the leading edge protection element such that the third section is arranged proximal the root of the wind turbine blade, and such that the second section is arranged between the first section and the third section.

The method may comprise applying an adhesive, e.g. a pressure sensitive adhesive or a two component adhesive, on a portion of the leading edge of the wind turbine blade.

The material of the leading edge protection element may have the form of a tape or sheet. The leading edge protection element may comprise an attachment surface and an exterior surface. The attachment surface of the leading edge protection element and the leading edge of the wind turbine blade may be joined by use of an adhesive, e.g. a pressure sensitive adhesive or a two component adhesive and/or a heat activated adhesive. The adhesive may be applied on the attachment surface of the leading edge protection element and/or on a portion of the leading edge of the wind turbine blade. Alternatively, the leading edge protection element and the leading edge of the wind turbine blade may be attached with an adhesive film or sheet. The adhesive may be a pressure, heat or UV activated adhesive. Alternatively, the leading edge protection element may be welded onto the wind turbine blade.

Alternatively, the leading edge protection element may be attached by applying, e.g. brushing or coating, a liquid form of the leading edge protection element on to the wind turbine blade. The liquid form of the leading edge protection element may be cured after application. The exterior surface of the leading edge protection element may be coated with another leading edge protection element having a liquid form. The coated leading edge protection element may be cured on the wind turbine blade. In this case additional adhesive may not be needed.

Alternatively, the leading edge protection element may be attached by applying, e.g. spraying, a powder deposition of the leading edge protection element on to the wind turbine blade.

Wind turbine blade may comprise a blade shell, e.g. comprising a first blade shell part and a second blade shell part, made of a composite material comprising fibre-reinforcement material embedded in a polymer material. The leading edge protection element may be distinct from the composite material of the blade shell.

The leading edge protection element may be embedded in the blade shell of leading edge of the wind turbine blade. Leading edge protection element may be configured to be embedded in the blade shell of the leading edge of a wind turbine blade. For example, the leading edge protection element may be laid up in the blade mould during layup of the fibre-reinforced material of the blade shell. The leading edge protection element may then be co-infused with resin and cured together with the fibre-reinforced material. The infusion resin may be epoxy, vinyl ester, polyester or polyurethane resin. The co-infused part may be cured using heat. The thickness of the first section may be between 0.2-0.5 mm. The thickness of the second section may be between 0.5-3.0 mm. The thickness of the third section may be less than 0.5 mm. The thickness may be measured at the thickest part of each section of the leading edge protection element.

Alternatively, the leading edge protection element may be co-infused with resin and cured together with fibre-reinforced material and the pre-cured leading edge protection element may be attached to the leading edge of a wind turbine blade.

The first section of the leading edge protection element may be co-infused with resin and cured together with fibre-reinforced material. The second section of the leading edge protection element may be co-infused with resin and cured together with fibre-reinforced material. The third section of the leading edge protection element may be co-infused with resin and cured together with fibre-reinforced material.

The first section and the second section may be attached to the leading edge of a wind turbine blade, e.g. such that the first section is attached further outboard than the second section, e.g. abutting or as an extension of the first section. The second section and the third section may be attached to the leading edge of a wind turbine blade, e.g. such that the second section is attached further outboard than the third section, e.g. abutting or as an extension of the second section.

The joint between the first section and the second section may be formed as a step or provided as a flush connection. The joint between the second section and the third section may be formed as a step or provided as a flush connection.

The length of the leading edge protection element measured between the outboard end to the inboard end may be at least 30% of the longitudinal length of the wind turbine blade. The leading edge protection element may have a length between 15-30% of the length of the wind turbine blade, such as between 20-25% of the length of the wind turbine blade. The length may be between 10-100 m, such as between 15-70 m, such as between 20-50 m. The length of the leading edge protection element may be smaller than the length of the leading edge of the wind turbine blade. Alternatively, the length of the leading edge protection element may be the same as the length of the leading edge of the wind turbine blade.

The length of the first section, e.g. measured between the outboard end and the first section position, may be between 5-35% of the blade length of the wind turbine blade, such as between 10-30% of the blade length, such as between 15-25%.

The length of the first section, e.g. measured between the outboard end and the first section position, may be between 1-15% of the blade length, such as between 5-10% of the blade length, such as around 10% of the blade length. The first section may have an extent in the longitudinal direction from the outboard end to the first section position between 1-15% of the blade length, such as between 5-15% of the blade length, such as around 10% of the blade length.

The length of the second section, e.g. measured between the first section position and the second section position, may be between 5-35% of the blade length of the wind turbine blade, such as between 10-30% of the blade length, such as between 15-25%.

The length of the second section, e.g. measured between the first section position and the second section position, may be between 15-25% of the blade length, such as around 20% of the blade length. The second section may have an extent in the longitudinal direction from the first section position to the second section position between 15-25% of the blade length, such as around 20% of the blade length.

The length of the third section, e.g. measured between the second section position and the inboard end, may be between 20-75% of the blade length of the wind turbine blade, such as between 30-70% of the blade length, such as between 40-65%.

The length of the third section, e.g. measured between the second section position and the inboard end, may be between 55-85% of the blade length, such as around 70% of the blade length. The third section may extend in the longitudinal direction from the second section position to the inboard end between 55-85% of the blade length, such as around 70% of the blade length.

The length of the first section may be 10% of the blade length, while the length of the second section may be 20% of the blade length, while the length of the third section may be 70% of the blade length.

The thickness of the leading edge protection element may be between 0.1-3.0 mm. The thickness of the leading edge protection element may be is less than 1.5 mm, such as between 0.2-0.5 mm, such as less than 0.5 mm, such as between 0.5-1.5 mm. The thickness may be measured at the thickest part of the leading edge protection element.

The length of the first section or the second section or the third section in the longitudinal direction may be between 1-24 m, such as between 10-12 m, such as around 12 m. The sections may be manufactured such that the length corresponds to the internal length of a transportation container.

Also disclosed is a leading edge protection element kit for a wind turbine blade. The leading edge protection element extends in a longitudinal direction between an outboard end and an inboard end, when mounted on a wind turbine blade.

The leading edge protection element comprises a first section extending from the outboard end to a first section position. The first section is made of a first erosion protection material having a first erosion resistance.

The leading edge protection element comprises a second section extending from the first section position to a second section position. The second section is made of a second erosion protective material having a second erosion resistance.

The first erosion resistance is larger than the second erosion resistance. At least a portion of the outboard end and/or a portion of the inboard end may be chamfered or tapered. The chamfered end portions provide a smoother transition from the leading edge protection element to the blade shell parts.

In a preferred embodiment, the disclosure relates to a leading edge protection element kit for a wind turbine blade. The leading edge protection element extends in a longitudinal direction between an outboard end and an inboard end, when mounted on a wind turbine blade.

The leading edge protection element comprises a first section extending from the outboard end to a first section position. The first section is made of a first erosion protection material having a first erosion resistance.

The leading edge protection element comprises a second section extending from the first section position to a second section position. The second section is made of a second erosion protective material having a second erosion resistance. The first erosion resistance is larger than the second erosion resistance.

The leading edge protection element comprises a third section extending from the second section position to the inboard end. The third section is made of a third erosion protection material having a third erosion resistance. The first erosion resistance and/or the second erosion resistance is larger than the third erosion resistance Alternatively, the leading edge protection element may comprise a plurality of separate leading edge protection elements, including a first leading edge protection element and a second leading edge protection element. The plurality of leading edge protection elements may extend along separate longitudinal parts of the wind turbine blade. The plurality of leading edge protection elements may abut one another.

It is envisaged that any embodiments or elements as described in connection with any one aspect may be used with any other aspects or embodiments, mutatis mutandis.

BRIEF DESCRIPTION OF THE FIGURES

Embodiments of the invention will be described in more detail in the following with regard to the accompanying figures. Like reference numerals refer to like elements throughout. Like elements may, thus, not be described in detail with respect to the description of each figure. The figures show one way of implementing the present invention and are not to be construed as being limiting to other possible embodiments falling within the scope of the attached claim set. In addition, an illustrated embodiment needs not have all the aspects or advantages shown. An aspect or an advantage described in conjunction with a particular embodiment is not necessarily limited to that embodiment and can be practiced in any other embodiment even if not so illustrated, or if not so explicitly described.

DETAILED DESCRIPTION

In the following figure description, the same reference numbers refer to the same elements and may thus not be described in relation to all figures.

Figure 1:
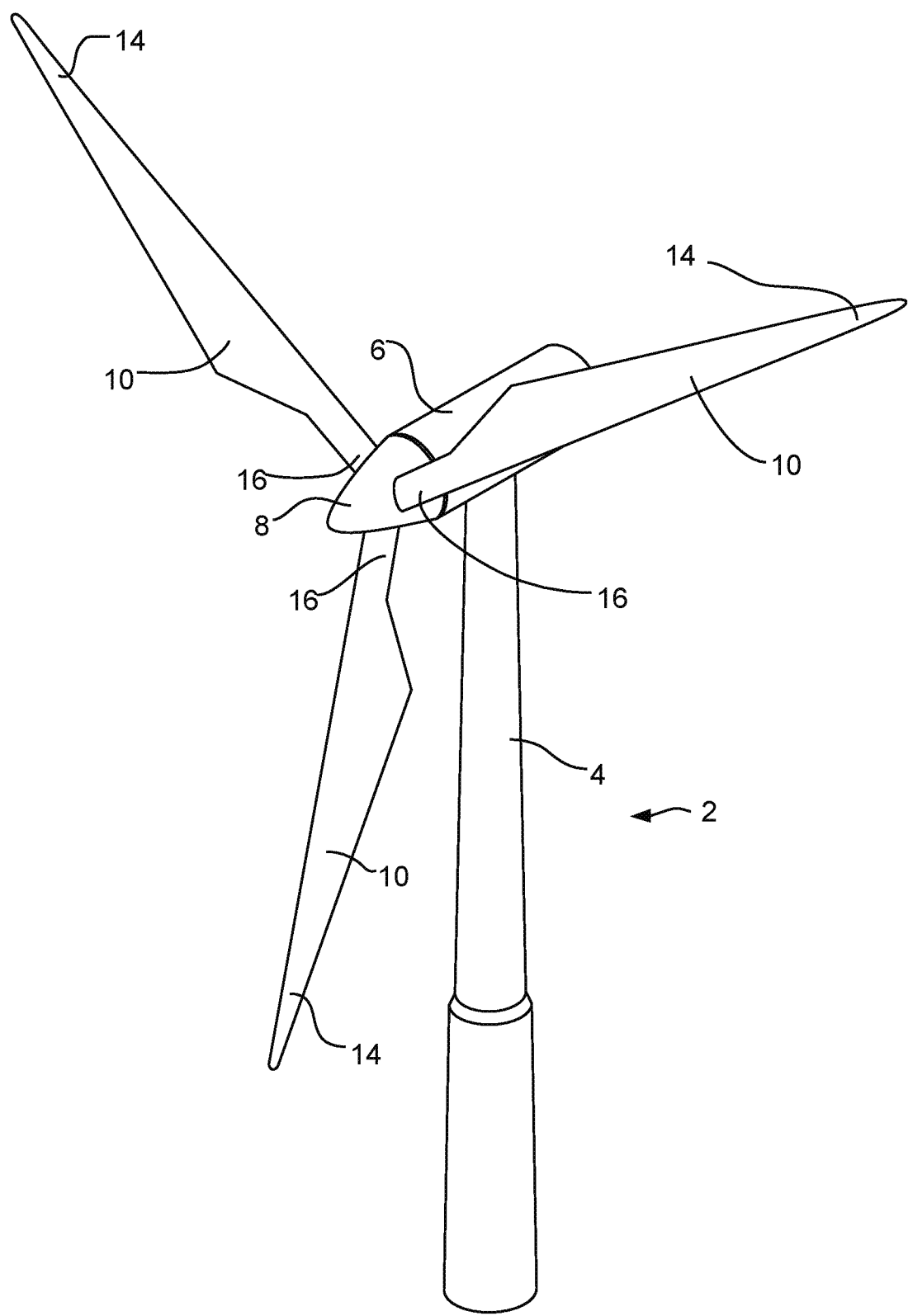
FIG. 1 is a schematic diagram illustrating an exemplary wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

Figure 2:
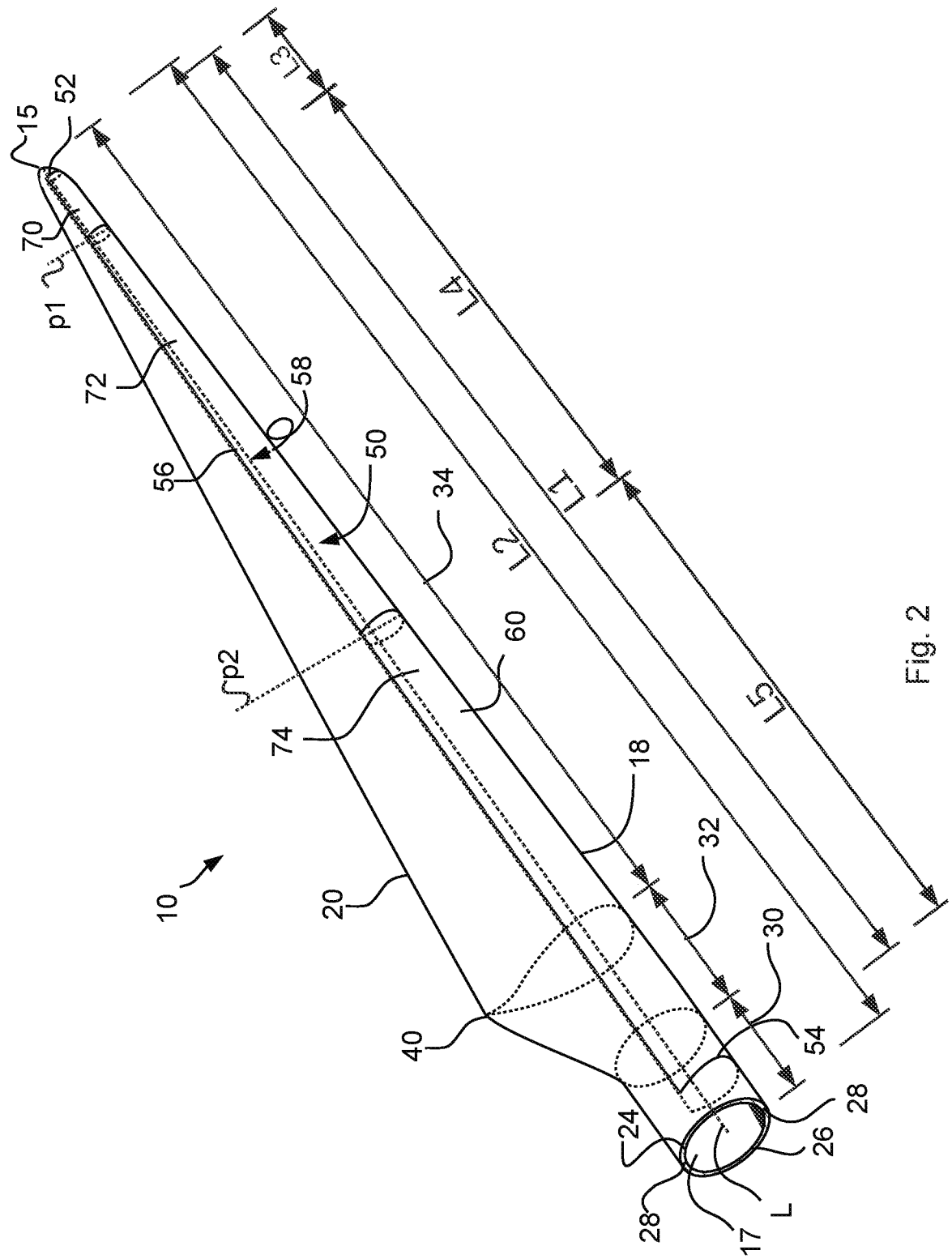
FIG. 2 is a schematic diagram illustrating an exemplary wind turbine blade.

FIG. 2 show a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating maximum lift at minimum drag for a particular wind speed and rotational speed range, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell comprising two blade shell parts or half shells, a first blade shell part 24 and a second blade shell part 26, typically made of fibre-reinforced polymer. The wind turbine blade 10 may comprise additional shell parts, such as a third shell part and/or a fourth shell part. The first blade shell part 24 is typically a pressure side or upwind blade shell part. The second blade shell part 26 is typically a suction side or downwind blade shell part. The first blade shell part 24 and the second blade shell part 26 are casted or welded together, or fastened together mechanically or chemically by an adhesive, such as glue, along bond lines or glue joints 28 extending along the trailing edge 20 and the leading edge 18 of the blade 10. Typically, the root ends of the blade shell parts 24, 26 has a semi-circular or semi-oval outer cross-sectional shape.

The wind turbine blade 10 comprises a leading edge protection element 50 on the leading edge 18 of the wind turbine blade 10. The leading edge protection element extends in a longitudinal direction between an outboard end 52 and an inboard end 54 and extends in a transverse direction between a first transverse end 56 and a second transverse end 58. The first transverse end 56 and the second transverse end 58 may extend substantially parallel to the longitudinal direction of the wind turbine blade 10. The leading edge protection element 50 has an attachment surface (not shown) and an exterior surface 60.

The longitudinal direction of the leading edge protection element 50 may be substantially parallel to the longitudinal direction of the wind turbine blade 10. The leading edge protection element 50 may have a length L1, i.e. the length between the outboard end 52 and the inboard end 54. The length L1 may be smaller than the length of the leading edge 18 of the wind turbine blade 10, such as illustrated. The length L1 may be 100% of the length of the leading edge 18 of the wind turbine blade 10. The length L1 of the leading edge protection element may be at least 30% of the length of the wind turbine blade 10.

The leading edge protection element 50 comprises a first section 70 extending from the outboard end 52 to a first section position p1. The first section 70 is made of a first erosion protection material having a first erosion resistance.

The first erosion protective material comprises a metal material, such as one or more of nickel-based alloy, titanium, stainless steel, aluminium, shape memory alloys, austenitic nickel-chromium-based alloys (e.g. Inconel). Examples of shape memory alloys may be copper-aluminium-nickel and nickel-titanium. The first section 70 may be arranged within a range that extends from 70-100% of the blade length L2 of the wind turbine blade 10 as seen from the root end 17. The length L3 of the first section 70 may be between 5-35% of the blade length L2.

The leading edge protection element 50 comprises a second section 72 extending from the first section position p1 to a second section position p2. The second section 72 is made of a second erosion protective material having a second erosion resistance. The second erosion protection material comprises a polymer material, such as one or more of Polyurethane thermoset rubbers, thermoplastic polyurethanes, UHMWPE, PEEK, polycarbonate, ABS or rubbers such, nitrile rubber (NBR), ethylene propylene diene monomer (EPDM), styrene-butadiene rubber (SBR) or polybutadiene. The first erosion resistance is larger than the second erosion resistance. This means that the first erosion protective material is stronger and more resistant to environmental factors, such as impact of rain droplets, than the second erosion protective material. Thus, it may take more time before damages are seen and before the damage reaches the underlying layer for the first erosion protective material than for the second erosion protective material. The second section 72 may abut the first section 70. The length L4 of the second section 72 may be between 5-35% of the blade length L2.

The leading edge protection element 50 comprises a third section 74 extending from the second section position p2 to the inboard end 54. The third section 74 is made of a third erosion protective material having a third erosion resistance. The third erosion protective material may comprise a gelcoat material, a paint system material or a thermoplastic material. Alternatively, the third section corresponds to the outer gel coat layer of the wind turbine blade. In this case, the leading edge protection element 50 comprises a first section 70 and a second section 72 which are attached to the leading edge of the wind turbine blade starting from the tip end. The length L5 of the third section 74 may be between 20-75% of the blade length L2.

Each of the first section 70, second section 72 and third section 74 may have a length of between 5-24 m, such as around 12 m.

The leading edge protection element 50 material may have the form of a tape, sheet, liquid or powder deposition. The material of the leading edge protection element 50 is distinct from the composite material of the blade shell parts 24, 26.

Figure 3:
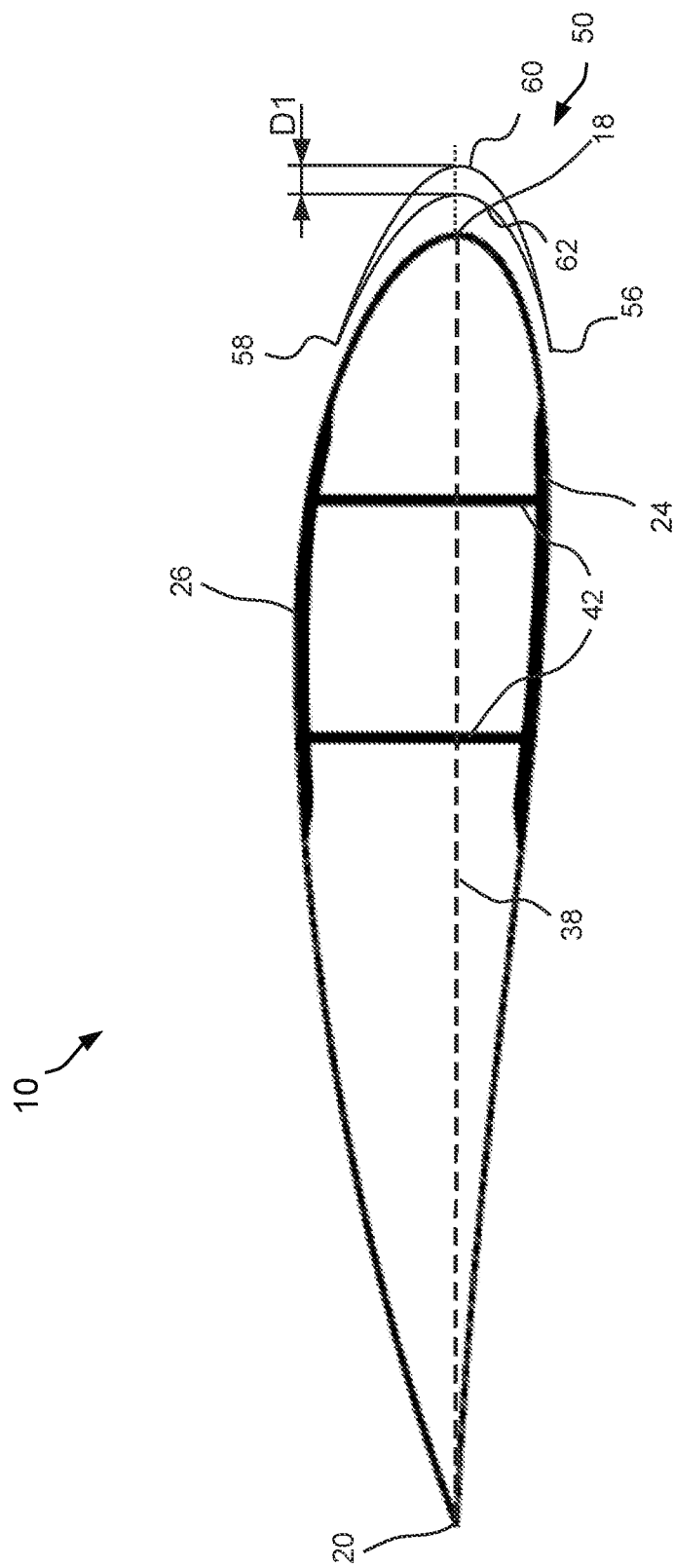
FIG. 3 is a schematic diagram illustrating a sectional view of an exemplary wind turbine blade.

FIG. 3 is a schematic diagram illustrating an exemplary wind turbine blade, e.g. the wind turbine blade 10 of FIGS. 1-2. The wind turbine blade 10 comprises a leading edge 18, a trailing edge 20, a pressure side 24 and a suction side 26. The wind turbine blade 10 comprises a chord line 38 between the leading edge 18 and the trailing edge 20. The wind turbine blade 10 comprises shear webs 42, such as a leading edge shear web and a trailing edge shear web. The shear webs 42 could alternatively be a spar box with spar sides, such as a trailing edge spar side and a leading edge spar side. The blade shell parts 24, 26 may be reinforced with fibre material, such as glass fibres, carbon fibre, or a combination thereof.

The wind turbine blade 10 may be protected by providing a leading edge protection element 50, such as the leading edge protection element 50 of FIG. 2. The leading edge protection element 50 may be attached to the leading edge 18 of the wind turbine blade 10 by arranging the leading edge protection element 50 such that an attachment surface 62 of the leading edge protection element 50 faces the leading edge 18 of the wind turbine blade 10. The leading edge protection element 50 may be attached by applying an adhesive, e.g. a pressure sensitive adhesive or a two component adhesive and/or a heat activated adhesive. The adhesive may be applied on the attachment surface 62 of the leading edge protection element 50 or on the leading edge 18 of the wind turbine blade 10. Alternatively, the leading edge protection element 50 may be mechanically fastened and/or welded onto the wind turbine blade 10. In the case where the leading edge protection element 50 is in a liquid form, the liquid may be brushed on the wind turbine blade 10. In the case where the leading edge protection element is in a powder deposition, the powder may be sprayed on the wind turbine blade 10.

The leading edge protection element 50 may be used in protection of the leading edge of completed wind turbine blades by attaching the leading edge protection element 50 to wind turbine blades coming out of the production or to wind turbine blades already installed in the field. Furthermore, the leading edge protection element 50 may be attached to portions of the leading edge where there is a need for repair of existing leading edge protection elements. Alternatively, the leading edge protection element 50 may be embedded in the blade shell of the leading edge 18 of the wind turbine blade 10 during layup in the production of the wind turbine blade 10.

The leading edge protection element 50 has a thickness D1, e.g. at the thickest point. The first transverse end 56 and the second transverse end 58 may be chamfered or tapered such that the transition to the airfoil is minimal. For example, the thickness D1 of the leading edge protection element 50 between the attachment surface 62 and the exterior surface 60 decreases towards the end portions 72, 74.

The thickness D1 may be the same in the first section, the second section and the third section. The thickness D1 in the third section may be smaller than the thickness in the first section and the second section.

Figure 4:
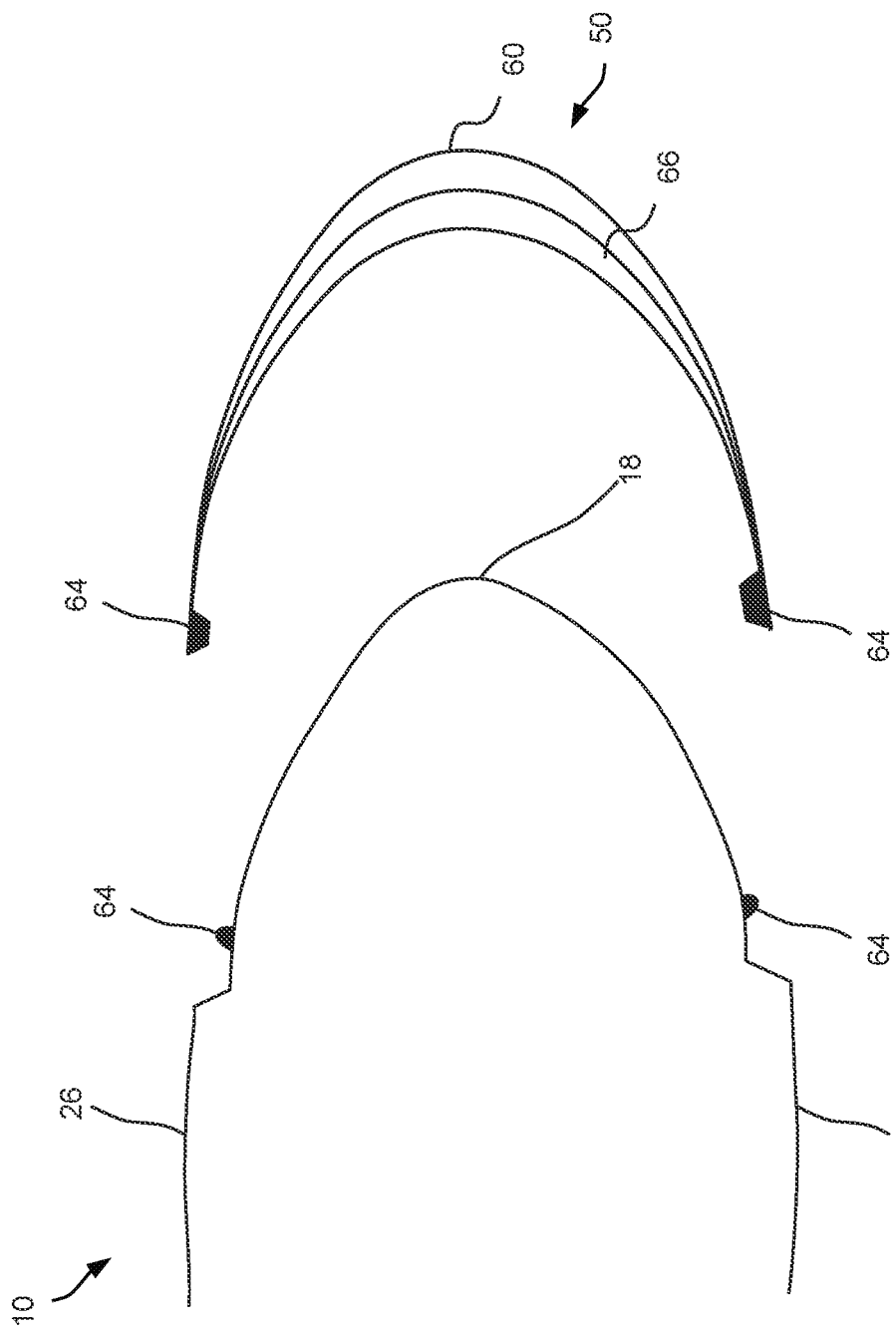
FIG. 4 is a schematic diagram illustrating a sectional view of an exemplary wind turbine blade.

FIG. 4 is a schematic diagram illustrating a sectional view of an exemplary wind turbine blade 10, such as the wind turbine blade of the previous figures. The leading edge protection element 50 is co-infused with resin and cured with fibre-reinforced material 66 to form a so called clip-on. The clip-on is attached to a leading edge 18 of a wind turbine blade 10. The leading edge protection element 50 and the wind turbine blade 10 may comprise fastening means 64 configured to secure the leading edge protection element 50 when attached to the wind turbine blade 10.

Each of the first section, second section and/or third section of the leading edge protection element may be co-infused with resin and cured with fibre-reinforced material to form separate leading edge protection element or a sectionized leading edge protection element. Thus, the leading edge protection element 50 in FIG. 4 may represent the first section, second section or the third section of the leading edge protection element.

Figure 5:
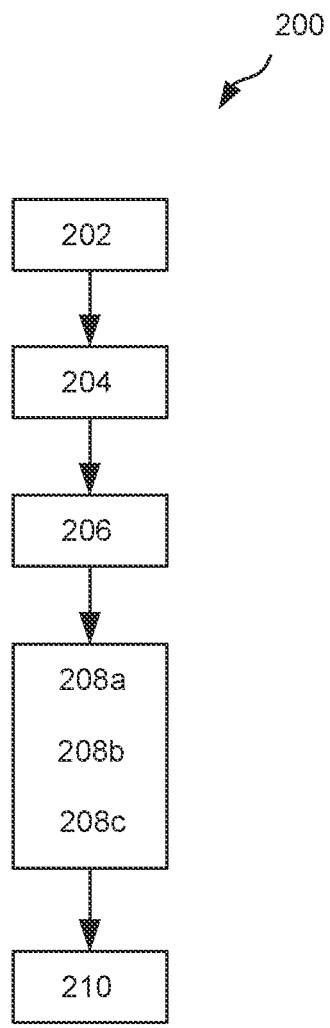
FIG. 5 is a block diagram of an exemplary method.

FIG. 5 is a block diagram of an exemplary method 200 for protecting a wind turbine blade, e.g. protecting the leading edge of the wind turbine blade.

The method 200 comprises providing 202 a wind turbine blade, such as the wind turbine blade 10 of FIGS. 1-3. The method 200 comprises providing 204 a leading edge protection element, such as the leading edge protection element 50 of FIGS. 2-3.

The method 200 comprises attaching 206 the leading edge protection element to at least part of the leading edge of the wind turbine blade. In the case where the leading edge protection element is in a liquid form, the leading edge protection element may be attached by brushing the liquid on the wind turbine blade. In the case where the leading edge protection element is in a powder deposition, the leading edge protection element may be attached by spraying the powder on the wind turbine blade.

The attaching 206 the leading edge protection element may comprise arranging 208a the leading edge protection element such that the first section is arranged proximal the tip of the wind turbine blade. The attaching 206 the leading edge protection element may comprise arranging 208b the leading edge protection element such that the second section is arranged proximal the root of the wind turbine blade. The attaching 206 the leading edge protection element may comprise arranging 208c the leading edge protection element such that a third section is arranged proximal the root of the wind turbine blade and the second section is arranged between the third section and the first section.

The method 200 may comprise applying 210 and adhesive, e.g. a pressure sensitive adhesive or a two component adhesive, on a portion of the leading edge of the wind turbine blade. Alternatively, the adhesive may be applied on an attachment surface, which faces the wind turbine blade when attached.

Items

Exemplary embodiments of the present disclosure are set out in the following items:

1. A wind turbine blade extending from a root end to a tip end, the wind turbine blade comprising a root region, and an airfoil region comprising the tip, a pressure side, a suction side and a chord extending between a leading edge and a trailing edge,
    the wind turbine blade comprising a leading edge protection element at the leading edge of the wind turbine blade, the leading edge protection element extending in a longitudinal direction between an outboard end and an inboard end and comprising:
    a first section extending from the outboard end to a first section position, wherein the first section is made of a first erosion protection material having a first erosion resistance, and
    a second section extending from the first section position to a second section position, wherein the second section is made of a second erosion protective material having a second erosion resistance,
    and wherein the first erosion resistance is larger than the second erosion resistance.
2. Wind turbine blade according to item 1, wherein the first erosion protection material comprises a metal material, such as one or more of nickel-based alloy, titanium, stainless steel, aluminium, shape memory alloys, austenitic nickel-chromium-based alloys.
3. Wind turbine blade according to any of the preceding items, wherein the second erosion protection material comprises a polymer material, such as one or more of Polyurethane thermoset rubbers, thermoplastic polyurethanes, UHMWPE, PEEK, polycarbonate, ABS or rubbers such as, nitrile rubber (NBR), ethylene propylene diene monomer (EPDM), styrene-butadiene rubber (SBR) or polybutadiene.
4. Wind turbine blade according to any of the preceding items comprising a blade shell made of a composite material comprising fibre-reinforcement material embedded in a polymer material, and wherein the leading edge protection element is distinct from the composite material of the blade shell.
5. Wind turbine blade according to any of the preceding items, wherein the leading edge protection element is embedded in the blade shell of leading edge of the wind turbine blade.
6. Wind turbine blade according to any of the preceding items, wherein the leading edge protection element is attached to an outer surface of the blade shell of the leading edge of the wind turbine blade.
7. Wind turbine blade according to any of the preceding items, wherein the leading edge protection element comprises a third section extending from the second section position to the inboard end, wherein the third section is made of a third erosion protection material having a third erosion resistance, and wherein the first erosion resistance and/or the second erosion resistance is larger than the third erosion resistance.
8. Wind turbine blade according to any of the preceding items, wherein the third erosion protection material comprises one or more of:
   a paint system material, such as conventional 2-component aliphatic polyurethane or 2-component epoxy, and/or
   a gelcoat material, such as epoxy, polyester or polyurethane, and/or
   a thermoplastic material, such as PMMA or PET.
9. Wind turbine blade according to any of the preceding items, wherein the length of the leading edge protection element measured between the outboard end to the inboard end is at least 30% of the longitudinal length of the wind turbine blade.
10. Wind turbine blade according to any of the preceding items, wherein the length of the first section measured between the outboard end and the first section position is between 5-35% of the blade length of the wind turbine blade, such as between 10-30% of the blade length, such as between 15-25%.
11. Wind turbine blade according to any of the preceding items, wherein the length of the second section measured between the first section position and the second section position is between 5-35% of the blade length of the wind turbine blade, such as between 10-30% of the blade length, such as between 15-25%.
12. Wind turbine blade according to any of the preceding items, wherein the length of the third section measured between the second section position and the inboard end is between 20-75% of the blade length of the wind turbine blade, such as between 30-70% of the blade length, such as between 40-65%.
13. Wind turbine blade according to any of the preceding items, wherein the length of the first section or the second section or the third section in the longitudinal direction is between 5-24 m, such as around 12 m.
14. A leading edge protection element kit for a wind turbine blade, the leading edge protection element extending in a longitudinal direction between an outboard end and an inboard end, when mounted on a wind turbine blade, the leading edge protection element comprising:
   a first section extending from the outboard end to a first section position, wherein the first section is made of a first erosion protection material having a first erosion resistance, and
   a second section extending from the first section position to a second section position, wherein the second section is made of a second erosion protective material having a second erosion resistance,
   and wherein the first erosion resistance is larger than the second erosion resistance.
15. Leading edge protection element according to item 14, wherein the first erosion protection material comprises a metal material, such as one or more of nickel-based alloy, titanium, stainless steel, aluminium, shape memory alloys, austenitic nickel-chromium-based alloys.
16. Leading edge protection element according to any of the items 14-15, wherein the second erosion protection material comprises a polymer material, such as one or more of Polyurethane thermoset rubbers, thermoplastic polyurethanes, UHMWPE, PEEK, polycarbonate, ABS or rubbers such, nitrile rubber (NBR), ethylene propylene diene monomer (EPDM), styrene-butadiene rubber (SBR) or polybutadiene.
17. Leading edge protection element according to any of the items 14-16 configured to be embedded in the blade shell of the leading edge of a wind turbine blade.
18. Leading edge protection element according to any of the items 14-17 configured to be attached to the outer surface of the blade shell of the leading edge of a wind turbine blade.
19. Leading edge protection element according to any of the items 14-18 comprising a third section extending from the second section position to the inboard end, wherein the third section is made of a third erosion protection material having a third erosion resistance, and wherein the first erosion resistance and/or the second erosion resistance is larger than the third erosion resistance.
20. Leading edge protection element according to any of the items 14-19, wherein the third erosion protection material comprises one or more of:
   a paint system material, such as conventional 2-component aliphatic polyurethane or 2-component epoxy, and/or
   a gelcoat material, such as epoxy, polyester or polyurethane, and/or
   a thermoplastic material, such as PMMA or PET.
21. Leading edge protection element according to any of the items 14-20, wherein the length of the first section or the second section or the third section in the longitudinal direction is between 8-16 m, such as around 12 m.
22. A method for protecting a leading edge of a wind turbine blade, the method comprising:
   providing a wind turbine blade, wherein the wind turbine blade extends from a root end to a tip end, and comprising a root region, and an airfoil region comprising the tip, a pressure side, a suction side and a chord extending between the leading edge and a trailing edge,
   providing a leading edge protection element at the leading edge of the wind turbine blade, the leading edge protection element extending in a longitudinal direction between an outboard end and an inboard end and comprising:

a first section extending from the outboard end to a first section position, wherein the first section is made of a first erosion protection material having a first erosion resistance, and a second section extending from the first section position to a second section position, wherein the second section is made of a second erosion protective material having a second erosion resistance, and wherein the first erosion resistance is larger than the second erosion resistance, and attaching the leading edge protection element to at least part of the leading edge of the wind turbine blade.

23. Method according to item 22, wherein attaching the leading edge protection element comprises arranging the leading edge protection element such that the first section is arranged proximal the tip of the wind turbine blade, and such that the second section is arranged proximal the root of the wind turbine blade.

24. Method according to any of the items 22-23, wherein attaching the leading edge protection element comprises applying an adhesive, e.g. a pressure sensitive adhesive or a two component adhesive, on a portion of the leading edge of the wind turbine blade.

LIST OF REFERENCES 2 wind turbine
4 tower
6 nacelle
8 hub
10 blade
12 blade part
14 blade tip
15 tip end
16 blade root
17 root end
18 leading edge
20 trailing edge
24 first blade shell part (pressure side)
26 second blade shell part (suction side)
28 bond lines/glue joints/fastening joints/welding joints/casting mould split lines
30 root region
32 transition region
34 airfoil region
40 shoulder
42 shear web or spar side
44 erosion sensitive area
50 leading edge protection element
52 outboard end
54 inboard end
56 first transverse end
58 second transverse end
60 exterior surface
62 attachment surface
64 fastening means
66 fibre-reinforced material
70 first section
72 second section
74 third section
L longitudinal axis
L1 length of leading edge protection element
L2 blade length
L3 length of first section
L4 length of second section
L5 length of third section
p1 first section position
p2 second section position
D1 thickness
200 method
202 providing wind turbine blade
204 providing leading edge protection element
206 attaching leading edge protection element
208a arranging leading edge protection element
208b arranging leading edge protection element
208c arranging leading edge protection element
210 applying adhesive

The invention claimed is:

1. A wind turbine blade extending from a root end to a tip end, the wind turbine blade comprising a root region, and an airfoil region comprising the tip, a pressure side, a suction side and a chord extending between a leading edge and a trailing edge, the wind turbine blade comprising a blade shell made of a composite material comprising fibre-reinforcement material embedded in a polymer material, the wind turbine blade further comprising a leading edge protection element at the leading edge of the wind turbine blade, the leading edge protection element extending in a longitudinal direction between an outboard end and an inboard end and comprising:

a first section extending from the outboard end to a first section position, wherein the first section is made of a first erosion protection material having a first erosion resistance, wherein the first erosion protection material comprises one or more of a nickel-based alloy or titanium;

a second section extending from the first section position to a second section position, wherein the second section is made of a second erosion protective material having a second erosion resistance, wherein the second erosion protection material comprises a polymer material comprising one or more of thermoplastic polyurethanes, UHMWPE, PEEK, polycarbonate or ABS; and a third section extending from the second section position to the inboard end, wherein the third section is made of a third erosion protection material having a third erosion resistance, and wherein the first erosion resistance and the second erosion resistance are larger than the third erosion resistance, wherein the third erosion protection material comprises one or more of:

a paint system material comprising conventional 2-component aliphatic polyurethane or 2-component epoxy; or a gelcoat material comprising epoxy, polyester or polyurethane, wherein the first erosion resistance is larger than the second erosion resistance, wherein the leading edge protection element is distinct from the composite material of the blade shell, and wherein a length of the first section measured between the outboard end and the first section position is between 1-15% of a blade length of the wind turbine blade.

2. The wind turbine blade according to claim 1, wherein the leading edge protection element is embedded in the blade shell of the leading edge of the wind turbine blade.

3. The wind turbine blade according to claim 1, wherein the leading edge protection element is attached to an outer surface of the blade shell of the leading edge of the wind turbine blade.

4. The wind turbine blade according to claim 1, wherein a length of the leading edge protection element measured between the outboard end to the inboard end is at least 30% of the blade length of the wind turbine blade.

5. A method for protecting a leading edge of a wind turbine blade, the method comprising:
providing the wind turbine blade, wherein the wind turbine blade extends from a root end to a tip end, and comprising a root region, and an airfoil region comprising the tip, a pressure side, a suction side and a chord extending between the leading edge and a trailing edge, and wherein the wind turbine blade comprises a blade shell made of a composite material comprising fibre-reinforcement material embedded in a polymer material,
providing a leading edge protection element at the leading edge of the wind turbine blade, the leading edge protection element extending in a longitudinal direction between an outboard end and an inboard end and comprising:
a first section extending from the outboard end to a first section position, wherein the first section is made of a first erosion protection material having a first erosion resistance, wherein the first erosion protection material comprises one or more of a nickel-based alloy or titanium;
a second section extending from the first section position to a second section position, wherein the second section is made of a second erosion protective material having a second erosion resistance, wherein the second erosion protection material comprises a polymer material comprising one or more of thermoplastic polyurethanes, UHMWPE, PEEK, polycarbonate or ABS; and
a third section extending from the second section position to the inboard end, wherein the third section is made of a third erosion protection material having a third erosion resistance, and wherein the first erosion resistance and the second erosion resistance are larger than the third erosion resistance, wherein the third erosion protection material comprises one or more of:
a paint system material comprising conventional 2-component aliphatic polyurethane or 2-component epoxy; or
a gelcoat material comprising epoxy, polyester or polyurethane,
wherein the first erosion resistance is larger than the second erosion resistance, and
wherein the leading edge protection element is distinct from the composite material of the blade shell, and
attaching the leading edge protection element to at least part of the leading edge of the wind turbine blade,
wherein a length of the first section measured between the outboard end and the first section position is between 1-15% of a blade length of the wind turbine blade.

6. A wind turbine blade extending from a root end to a tip end, the wind turbine blade comprising a root region, and an airfoil region comprising the tip, a pressure side, a suction side and a chord extending between a leading edge and a trailing edge,
the wind turbine blade comprising a blade shell made of a composite material comprising fibre-reinforcement material embedded in a polymer material,
the wind turbine blade further comprising a leading edge protection element at the leading edge of the wind turbine blade, the leading edge protection element extending in a longitudinal direction between an outboard end and an inboard end and comprising:
a first section extending from the outboard end to a first section position, wherein the first section is made of a first erosion protection material having a first erosion resistance, wherein the first erosion protection material comprises one or more of a nickel-based alloy or titanium;
a second section extending from the first section position to a second section position, wherein the second section is made of a second erosion protective material having a second erosion resistance, wherein the second erosion protection material comprises a polymer material comprising one or more of thermoplastic polyurethanes, UHMWPE, PEEK, polycarbonate or ABS; and
a third section extending from the second section position to the inboard end, wherein the third section is made of a third erosion protection material having a third erosion resistance, and wherein the first erosion resistance and the second erosion resistance are larger than the third erosion resistance, wherein the third erosion protection material comprises one or more of:
a paint system material comprising conventional 2-component aliphatic polyurethane or 2-component epoxy; or
a gelcoat material comprising epoxy, polyester or polyurethane,
wherein the first erosion resistance is larger than the second erosion resistance,
wherein the leading edge protection element is distinct from the composite material of the blade shell, and
wherein a length of the second section measured between the first section position and the second section position is between 15-25% of a blade length of the wind turbine blade.

7. The wind turbine blade according to claim 6, wherein the leading edge protection element is embedded in the blade shell of the leading edge of the wind turbine blade.

8. The wind turbine blade according to claim 6, wherein the leading edge protection element is attached to an outer surface of the blade shell of the leading edge of the wind turbine blade.

9. The wind turbine blade according to claim 6, wherein a length of the leading edge protection element measured between the outboard end to the inboard end is at least 30% of the blade length of the wind turbine blade.

10. A wind turbine blade extending from a root end to a tip end, the wind turbine blade comprising a root region, and an airfoil region comprising the tip, a pressure side, a suction side and a chord extending between a leading edge and a trailing edge,
the wind turbine blade comprising a blade shell made of a composite material comprising fibre-reinforcement material embedded in a polymer material,
the wind turbine blade further comprising a leading edge protection element at the leading edge of the wind turbine blade, the leading edge protection element extending in a longitudinal direction between an outboard end and an inboard end and comprising:

a first section extending from the outboard end to a first section position, wherein the first section is made of a first erosion protection material having a first erosion resistance, wherein the first erosion protection material comprises one or more of a nickel-based alloy or titanium;

a second section extending from the first section position to a second section position, wherein the second section is made of a second erosion protective material having a second erosion resistance, wherein the second erosion protection material comprises a polymer material comprising one or more of thermoplastic polyurethanes, UHMWPE, PEEK, polycarbonate or ABS; and a third section extending from the second section position to the inboard end, wherein the third section is made of a third erosion protection material having a third erosion resistance, and wherein the first erosion resistance and the second erosion resistance are larger than the third erosion resistance, wherein the third erosion protection material comprises one or more of:

a paint system material comprising conventional 2-component aliphatic polyurethane or 2-component epoxy; or a gelcoat material comprising epoxy, polyester or polyurethane, wherein the first erosion resistance is larger than the second erosion resistance, wherein the leading edge protection element is distinct from the composite material of the blade shell, and wherein a length of the third section measured between the second section position and the inboard end is between 55-85% of a blade length of the wind turbine blade.

11. The wind turbine blade according to claim 10, wherein the leading edge protection element is embedded in the blade shell of the leading edge of the wind turbine blade.

12. The wind turbine blade according to claim 10, wherein the leading edge protection element is attached to an outer surface of the blade shell of the leading edge of the wind turbine blade.

13. A method for protecting a leading edge of a wind turbine blade, the method comprising:

providing the wind turbine blade, wherein the wind turbine blade extends from a root end to a tip end, and comprising a root region, and an airfoil region comprising the tip, a pressure side, a suction side and a chord extending between the leading edge and a trailing edge, and wherein the wind turbine blade comprises a blade shell made of a composite material comprising fibre-reinforcement material embedded in a polymer material, providing a leading edge protection element at the leading edge of the wind turbine blade, the leading edge protection element extending in a longitudinal direction between an outboard end and an inboard end and comprising:

a first section extending from the outboard end to a first section position, wherein the first section is made of a first erosion protection material having a first erosion resistance, wherein the first erosion protection material comprises one or more of a nickel-based alloy or titanium;

a second section extending from the first section position to a second section position, wherein the second section is made of a second erosion protective material having a second erosion resistance, wherein the second erosion protection material comprises a polymer material comprising one or more of thermoplastic polyurethanes, UHMWPE, PEEK, polycarbonate or ABS; and a third section extending from the second section position to the inboard end, wherein the third section is made of a third erosion protection material having a third erosion resistance, and wherein the first erosion resistance and the second erosion resistance are larger than the third erosion resistance, wherein the third erosion protection material comprises one or more of:

a paint system material comprising conventional 2-component aliphatic polyurethane or 2-component epoxy; or a gelcoat material comprising epoxy, polyester or polyurethane, wherein the first erosion resistance is larger than the second erosion resistance, and wherein the leading edge protection element is distinct from the composite material of the blade shell, and attaching the leading edge protection element to at least part of the leading edge of the wind turbine blade, wherein a length of the second section measured between the first section position and the second section position is between 15-25% of a blade length of the wind turbine blade.

14. A method for protecting a leading edge of a wind turbine blade, the method comprising:

providing the wind turbine blade, wherein the wind turbine blade extends from a root end to a tip end, and comprising a root region, and an airfoil region comprising the tip, a pressure side, a suction side and a chord extending between the leading edge and a trailing edge, and wherein the wind turbine blade comprises a blade shell made of a composite material comprising fibre-reinforcement material embedded in a polymer material, providing a leading edge protection element at the leading edge of the wind turbine blade, the leading edge protection element extending in a longitudinal direction between an outboard end and an inboard end and comprising:

a first section extending from the outboard end to a first section position, wherein the first section is made of a first erosion protection material having a first erosion resistance, wherein the first erosion protection material comprises one or more of a nickel-based alloy or titanium;

a second section extending from the first section position to a second section position, wherein the second section is made of a second erosion protective material having a second erosion resistance, wherein the second erosion protection material comprises a polymer material comprising one or more of thermoplastic polyurethanes, UHMWPE, PEEK, polycarbonate or ABS; and a third section extending from the second section position to the inboard end, wherein the third section is made of a third erosion protection material having a third erosion resistance, and wherein the first erosion resistance and the second erosion resistance are larger than the third erosion resistance, wherein the third erosion protection material comprises one or more of:

a paint system material comprising conventional 2-component aliphatic polyurethane or 2-component epoxy; or a gelcoat material comprising epoxy, polyester or polyurethane, wherein the first erosion resistance is larger than the second erosion resistance, and wherein the leading edge protection element is distinct from the composite material of the blade shell, and attaching the leading edge protection element to at least part of the leading edge of the wind turbine blade, wherein a length of the third section measured between the second section position and the inboard end is between 55-85% of a blade length of the wind turbine blade.

* * * * *